United States Patent
Jacobson et al.

(10) Patent No.: US 9,050,968 B2
(45) Date of Patent: Jun. 9, 2015

(54) HYBRID ENGINE ASSEMBLY AND METHOD

(71) Applicant: CATERPILLAR, INC., Peoria, IL (US)

(72) Inventors: Evan Earl Jacobson, Edwards, IL (US); Bryan Thomas Siegel, Brimfield, IL (US); Timothy Michael O'Donnell, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 109 days.

(21) Appl. No.: 13/716,873

(22) Filed: Dec. 17, 2012

(65) Prior Publication Data

US 2014/0171265 A1 Jun. 19, 2014

(51) Int. Cl.
*B60W 10/24* (2006.01)
*B60K 6/10* (2006.01)
*B60W 10/30* (2006.01)

(52) U.S. Cl.
CPC .............. *B60W 10/24* (2013.01); *Y10T 477/78* (2015.01); *Y10T 477/73* (2015.01); *Y10T 477/27* (2015.01); *B60K 6/105* (2013.01); *B60W 10/30* (2013.01); *Y02T 10/6204* (2013.01)

(58) Field of Classification Search
CPC ...... B60W 10/24; B60W 10/30; B60K 6/105; Y10T 477/27
USPC ................. 477/5, 181; 74/329, 572.2; 475/5; 180/53.8, 65.28
See application file for complete search history.

(56) References Cited

U.S. PATENT DOCUMENTS

| | | | |
|---|---|---|---|
| 3,882,950 A * | 5/1975 | Strohlein | 180/165 |
| 4,037,409 A * | 7/1977 | Leibach | 60/413 |
| 4,171,029 A * | 10/1979 | Beale | 180/54.1 |
| 4,499,965 A | 2/1985 | Oetting et al. | |
| 4,588,040 A * | 5/1986 | Albright et al. | 180/165 |
| 4,606,193 A | 8/1986 | Molina | |
| 4,680,986 A | 7/1987 | Elsner | |
| 6,024,667 A | 2/2000 | Krohm et al. | |
| 6,048,288 A * | 4/2000 | Tsujii et al. | 477/5 |
| 6,668,953 B1 * | 12/2003 | Reik et al. | 180/53.8 |
| 7,540,346 B2 | 6/2009 | Hu | |
| 8,496,553 B2 * | 7/2013 | Tanaka et al. | 475/5 |
| 2009/0280941 A1 * | 11/2009 | Dusenberry et al. | 475/5 |
| 2010/0117375 A1 | 5/2010 | Kwok | |
| 2010/0152984 A1 | 6/2010 | Bowman et al. | |
| 2011/0114406 A1 | 5/2011 | Gibson et al. | |
| 2011/0175370 A1 | 7/2011 | Dugas | |
| 2013/0091985 A1 * | 4/2013 | Van Druten et al. | 74/7 C |
| 2013/0247858 A1 * | 9/2013 | Van Druten et al. | 123/179.22 |
| 2014/0045651 A1 * | 2/2014 | Jacobson | 477/70 |
| 2014/0046538 A1 * | 2/2014 | Siegel et al. | 701/36 |

FOREIGN PATENT DOCUMENTS

| | | |
|---|---|---|
| WO | WO 82/01519 | 5/1982 |
| WO | WO 2007/138353 A2 | 12/2007 |
| WO | WO2010068100 A1 * | 6/2010 |

* cited by examiner

*Primary Examiner* — Roger Pang
(74) *Attorney, Agent, or Firm* — Miller, Matthias & Hull LLP

(57) ABSTRACT

A hybrid engine assembly may include an engine having a crankshaft, a supplemental shaft mechanically coupled to the crankshaft, a flywheel energy storage assembly, and an auxiliary device. A flywheel clutch may selectively couple the flywheel assembly to the crankshaft. The assembly may be selectively operated in an engine restart mode by directly coupling the flywheel energy storage assembly to the crankshaft prior to starting the engine, and in an auxiliary power mode by directly coupling the flywheel energy storage assembly to the auxiliary device.

17 Claims, 3 Drawing Sheets

HYBRID ENGINE ASSEMBLY AND METHOD

TECHNICAL FIELD

The present disclosure generally relates to hybrid engines having flywheel energy storage devices, and more particularly to systems and methods for efficiently storing and deploying energy from such hybrid engines provided on machines.

BACKGROUND

Flywheels are generally known in the art for storing energy. While flywheel energy storage devices have been used for many years in satellite or other spacecraft applications, more recently they have been adapted for use on terrestrial machines. More specifically, hybrid power plants have been proposed which use a combustion engine as the primary mover and a flywheel as a secondary mover.

While early flywheels were formed of a metal material, more recently flywheels have been proposed that are formed of different materials that may increase the energy storage capacity of the flywheel. For example, flywheels may be formed of a carbon fiber material that has a higher strength-to-weight ratio and therefore can rotate at higher speeds (such as, for example, approximately 60,000 rpm or more). The higher rotational speeds increase the storage capacity of the flywheel.

The rotational speed of the flywheel is relatively high when compared to the output of a typical engine for a machine. For example, flywheel speeds are generally in the range of 10,000-60,000 rpm, while engines will typically operate at speeds of approximately 500-2,000 rpm. To accommodate for this difference in speeds, conventional flywheel systems will often incorporate a continuously variable transmission (CVT) or other similarly elaborate assembly to interface between the flywheel and the other powertrain components. For example, while U.S. Pat. No. 4,680,986 to Elsner discloses a flywheel coupled to an engine, a series of mechanical devices, including a hydrodynamic coupling, are disposed between the engine and the flywheel. Consequently, the efficiency of energy transfer between the flywheel and the engine is decreased.

SUMMARY OF THE DISCLOSURE

In accordance with one aspect of the disclosure, a hybrid engine assembly is provided for a machine having a transmission for driving a ground engaging member. The hybrid engine assembly may include an engine having a crankshaft configured to selectively engage the transmission, a supplemental shaft mechanically coupled to the crankshaft, a flywheel energy storage assembly including a flywheel body coupled to a flywheel shaft, and a flywheel clutch configured to selectively couple the flywheel shaft to the supplemental shaft, and a controller operably coupled to the engine and the flywheel clutch.

In another aspect of the disclosure that may be combined with any of these aspects, a machine is provided that may include an engine including a crankshaft, a transmission operatively coupled to the crankshaft, the transmission including a transmission output shaft, at least one ground engaging member operably coupled to the transmission output shaft, a supplemental shaft mechanically coupled to the crankshaft, a flywheel energy storage assembly including a flywheel body coupled to a flywheel shaft, and a flywheel clutch configured to selectively couple the flywheel shaft to the supplemental shaft, and a controller operably coupled to the engine and the flywheel clutch.

In another aspect of the disclosure that may be combined with any of these aspects, a method is provided of operating a hybrid engine assembly including an engine. The engine may have a crankshaft, a flywheel energy storage assembly configured for selective coupling to the crankshaft, and an auxiliary device. The method may include selectively operating in an engine restart mode by directly coupling the flywheel energy storage assembly to the crankshaft prior to starting the engine, and selectively operating in an auxiliary power mode by directly coupling the flywheel energy storage assembly to the auxiliary device.

DETAILED DESCRIPTION

Embodiments of a hybrid engine assembly are disclosed for use with a machine. In some embodiments, the hybrid engine assembly may include a direct mechanical coupling, such as a set of gears, to connect a flywheel energy storage assembly to an engine, thereby to more efficiently transfer energy between the engine and the flywheel energy storage assembly. Some of the embodiments disclosed herein permit the hybrid engine assembly to operate in an engine restart mode, where the flywheel may be used to rotate the crankshaft before the engine is started. In other embodiments, the flywheel may be used to operate hotel loads, such as auxiliary devices, without the engine operating.

Figure 1:
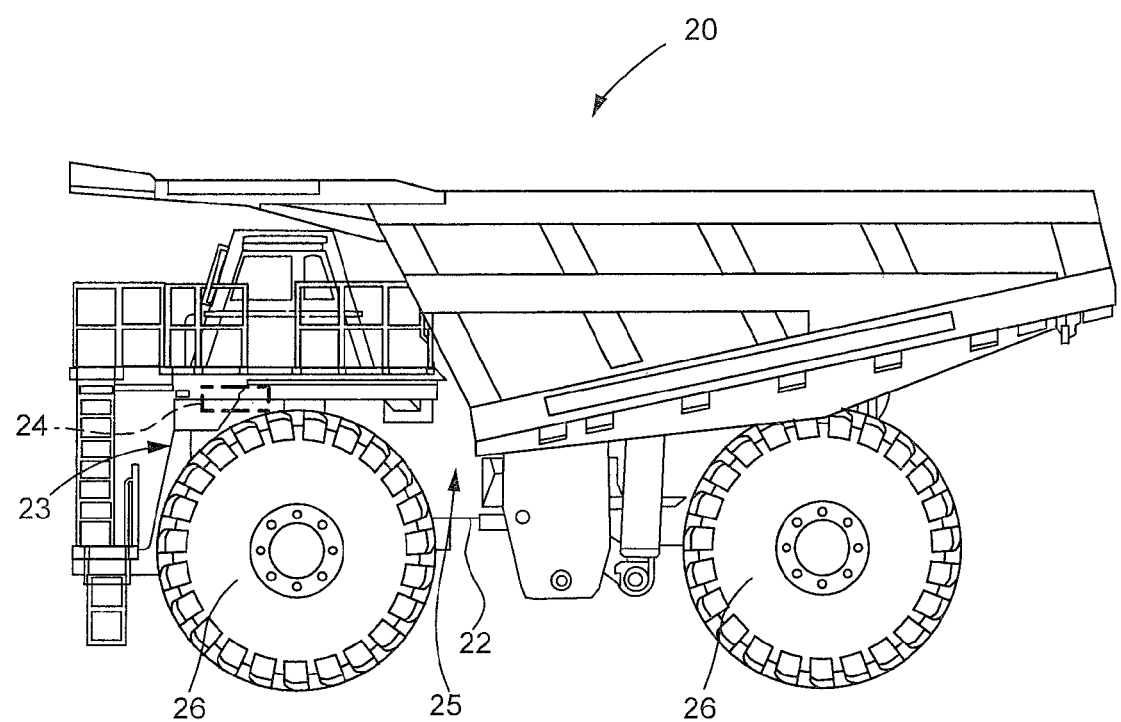
FIG. 1 is a side elevation view of a machine having a flywheel energy storage assembly according to the present disclosure.

FIG. 1 illustrates an exemplary machine 20. The machine 20 may be a mining truck, as shown, or any other type of machine, including on-highway machines, off-highway machines, earth moving equipment, generators, aerospace machines, locomotive machines, marine machines, or other engine powered applications. The machine 20 may include a chassis 22 and a powertrain 23 mounted on the chassis. The powertrain 23 may include a prime mover, such as an internal combustion engine 24, operably coupled to a drivetrain 25. The engine 24 may be any type of engine (internal combustion, gas, diesel, gaseous fuel, natural gas, propane, etc.), may be of any size, with any number of cylinders, and in any configuration ("V," in-line, radial, etc.). In the illustrated embodiment, the engine 24 generates power in the form of a rotating crankshaft 30 with operating speeds in a predetermined range, such as approximately 500-2000 rpm. The crankshaft 30 may be coupled to the drivetrain 25, thereby to transmit power from the engine 24 to ground engaging members 26. The ground engaging members 26 may be tires (as shown), tracks, or the like that may be suitable for a particular application.

Figure 2:
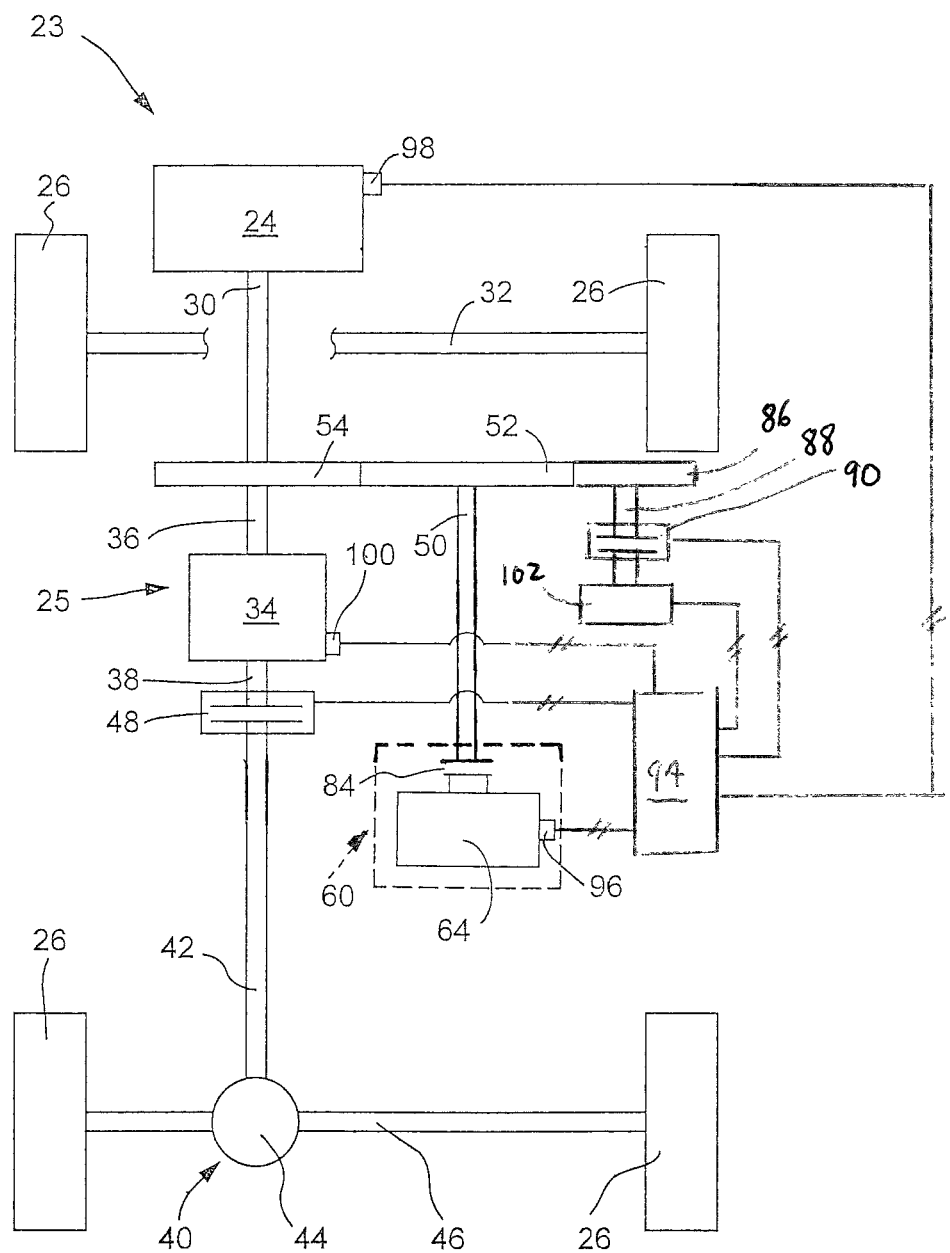
FIG. 2 is a schematic illustration of an exemplary embodiment of a flywheel energy storage assembly in conjunction with a powertrain provided on the machine of FIG. 1.

The drivetrain 25 may mechanically couple the engine 24 to one or more of the ground engaging members 26. As schematically illustrated in FIG. 2, the drivetrain 25 may be configured for rear wheel drive. Accordingly, the drivetrain 25 may include a transmission 34 having a transmission input shaft 36 operably coupled to the engine 24 and a transmission output shaft 38. A lower powertrain 40 may have a lower powertrain input shaft 42 operably coupled to the transmission output shaft 38. In the illustrated embodiment, the lower powertrain may include a differential 44 operably coupled to a rear axle 46 which may provide a torque output to two rear ground engaging members 26. A transmission output clutch 48 is configured to selectively couple the transmission output shaft 38 to the lower powertrain input shaft 42. Additionally or alternatively, the drivetrain 25 may be configured for front wheel or all wheel drive (not shown).

The drivetrain 25 may further include a supplemental shaft 50 connected in parallel to the transmission input shaft 36. In the illustrated embodiment, the supplemental shaft 50 may be coupled to a supplemental gear 52 that engages a transmission input gear 54 coupled to the transmission input shaft 36. Accordingly, the supplemental shaft 50 may be directly coupled to the engine 24 via the gears 52, 54, transmission input shaft 36, and the crankshaft 30. The supplemental and transmission input gears 52, 54 may be provided as spur gears, worm gears, or other types of gears that are configured to directly engage each other and form a gear set. The gear set may have a gear ratio to accommodate the relative speed difference between the crankshaft 30 and supplemental shaft 50. For example, the gear ratio may be approximately 20:1, which may advantageously accommodate the difference between the engine operating speed and the flywheel operating speed.

Figure 3:
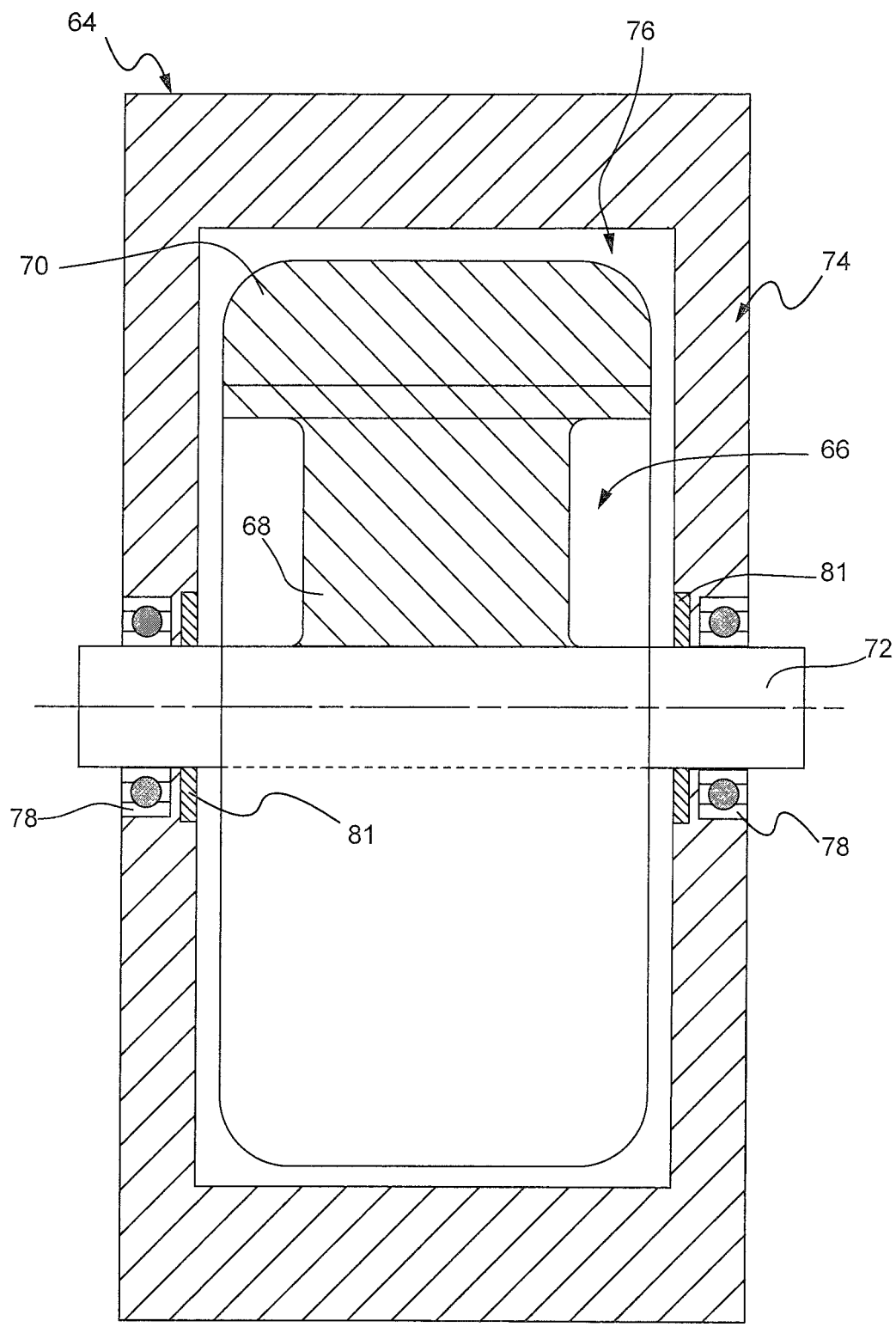
FIG. 3 is an enlarged schematic illustration of a flywheel used in the flywheel energy storage assembly of FIG. 2.

A flywheel energy storage assembly 60 may be provided for storing energy from and/or discharging energy to the engine 24. As best shown in FIG. 3, the flywheel energy storage assembly 60 may include a flywheel 64. The flywheel 64 may include a flywheel body 66 having a hub 68 and a rim 70. The hub 68 may be formed of a material, such as aluminum or steel, which is suitable for supporting the mass of the rim 70 when the flywheel body 66 rotates at speeds of up to 60,000 rpm or more. The rim 70 may be formed of any suitable flywheel material, such as iron, steel, or carbon fiber. A flywheel shaft 72 may be coupled to the hub 68 and supported for rotation by a flywheel housing 74. A flywheel clutch 84 may be configured to selectively couple the flywheel shaft 72 to the supplemental shaft 50, as discussed in greater detail below.

The flywheel housing 74 may define a chamber 76 sized to receive the flywheel body 66 and at least a portion of the flywheel shaft 72. Bearings 78 may be coupled to opposite sides of the flywheel housing 74 to journally support respective portions of the flywheel shaft 72. Two shaft seals 81 may be disposed between opposite sides of the flywheel housing 74 and the flywheel shaft 72 to provide air tight seals. A vacuum pump (not shown) may fluidly communicate with the chamber 76 to generate a partial vacuum inside the flywheel housing 74. The flywheel 64 may further include a cooling system (not shown) to maintain the flywheel chamber 76 at a desirable operating temperature.

A controller, such as electronic control module (ECM) 94, may be provided to control operation of the engine assembly and other components provided on the machine 20. For example, the ECM 94 may be operably coupled to the engine 24, the transmission 34, the transmission output clutch 48, and the flywheel clutch 84, thereby to control operation of these components based on user inputs or feedback regarding operating parameters. The ECM 94 may include any components that may be used to run an application such as, for example, a memory, a secondary storage device, and a central processing unit. The ECM 94 may, however, contain additional or different components such as, for example, mechanical or hydromechanical devices. Various other known circuits may be associated with the ECM 94 such as, for example, power supply circuitry, signal-conditioning circuitry, solenoid driver circuitry, and other appropriate circuitry. While the ECM 94 is depicted in the drawings as a single controller, connected, multiple controllers may be used.

One or more feedback sensors may be provided for monitoring operating parameters of the machine 20. For example, a flywheel speed sensor 96 may be provided that is configured to sense a rotational speed of the flywheel 64 and generate a flywheel speed signal. Additionally or alternatively, an engine speed sensor 98 may be provided that is configured to sense an engine speed and generate an engine speed signal, and a drivetrain speed sensor 100 may be provided that is configured to sense a rotational speed of a drivetrain component, such as the transmission 34, and generate a drivetrain speed signal.

The machine 20 may further include an auxiliary device that may be powered by the flywheel energy storage assembly 60. For example, a hydraulic pump 102 may be operably coupled to the flywheel shaft 72 by an auxiliary gear 86, an auxiliary shaft 88, and an auxiliary clutch 90. The hydraulic pump 102 may be used to operate any hydraulically powered system provided on the machine 20. The auxiliary clutch 90 and hydraulic pump 102 further may be operatively coupled to the ECM 94, as shown in FIG. 2.

INDUSTRIAL APPLICABILITY

Certain of the exemplary embodiments of hybrid engine assemblies and methods may be advantageously employed on machines having ground engaging members. A simple mechanical connection may be used to couple the engine 24 to the flywheel energy storage assembly 60, thereby increasing energy transfer efficiency between the two.

Additionally, the ECM 94 may be configured to operate the hybrid engine assembly in multiple alternative modes. In an engine restart mode, for example, the flywheel energy storage assembly 60 may be used to rotate the crankshaft 30 prior to starting the engine 24, thereby to reduce or eliminate the need for engine idle or otherwise improve fuel efficiency during engine startup. To operate in engine restart mode, the flywheel 64 must be rotating at a sufficient speed. This may be achieved during previous operation of the machine 20, where the engine 24 or regenerative braking has been used to transfer power to the flywheel 64. When the engine 24 is subsequently turned off, the flywheel energy storage assembly 60 may continue to operate so that the flywheel 64 is still rotating and therefore continues to store power. In engine restart mode, the flywheel clutch 84 may be engaged while the transmission output clutch 48 is disengaged, thereby to permit rotation of the crankshaft 30 without causing machine travel.

By mechanically coupling the flywheel 64 to the crankshaft 30 in the engine restart mode, the crankshaft 30 may be brought to an initial speed with the engine off. Subsequent restart of the engine, therefore, will require a reduced or minimal amount of power from the engine 24 to rotate the crankshaft 30 within the desired operating range, thereby increasing fuel efficiency during engine startup. The increased efficiency may influence engine control by substituting engine shut down for operating conditions that would normally call for engine idle, thereby further increasing fuel efficiency.

Alternatively, the ECM 94 may be configured to operate the hybrid engine assembly in an auxiliary power mode. In the auxiliary power mode, the flywheel energy storage assembly 60 may be used to rotate an auxiliary device, such as the hydraulic pump 102, thereby to reduce or eliminate the need to operate the engine 24 to operate the auxiliary device. Again, the flywheel 64 may be rotating at a sufficient speed from prior operation of the machine 20, during which power was transferred to the flywheel 64. When the engine 24 is subsequently turned off, the flywheel energy storage assembly 60 may continue to operate so that the flywheel 64 is still rotating and therefore continues to store power. In auxiliary power mode, the flywheel clutch 84 may be engaged, the transmission output clutch 48 may be disengaged, and the auxiliary clutch 90 may be engaged, thereby to provide power input to the auxiliary device without causing machine travel.

By mechanically coupling the flywheel 64 to the auxiliary device in the auxiliary power mode, the auxiliary shaft 88 may be rotated at a sufficient speed to permit operation with the engine off. Thus, fuel consumption is reduced or eliminated during operation of the auxiliary device.

By providing an ECM 94 configured to operate in engine restart and auxiliary power modes, the machine 20 may be operated with greater fuel efficiency. Additionally, by providing a more simplified mechanical connection between the flywheel energy storage assembly 60 and the engine 24, the flywheel 64 is able to more efficiently store and release power as desired.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A hybrid engine assembly for a machine having a transmission for driving a ground engaging member without a motor-generator set, the hybrid engine assembly comprising:
   an engine having a crankshaft configured to engage the transmission;
   a supplemental shaft mechanically coupled to the crankshaft;
   a flywheel energy storage assembly including a flywheel body coupled to a flywheel shaft, and a mechanical flywheel clutch configured to selectively and directly couple the flywheel shaft to the supplemental shaft;
   an auxiliary device selectively coupled to the flywheel shaft by an auxiliary clutch; and
   a controller operably coupled to the engine, the flywheel clutch, and the auxiliary clutch and configured to selectively operate in an auxiliary power mode in which the flywheel clutch is engaged and the auxiliary clutch is engaged.

2. The hybrid engine assembly of claim 1, in which a gear set mechanically couples the supplemental shaft to the crankshaft.

3. The hybrid engine assembly of claim 2, in which the gear set has a gear ratio of approximately 20:1.

4. The hybrid engine assembly of claim 3, in which the gear set comprises a first spur gear coupled to the crankshaft and a second spur gear coupled to the supplemental shaft, wherein the first spur gear directly engages the second spur gear.

5. The hybrid engine assembly of claim 1, in which the controller is configured to selectively operate the engine assembly in an engine restart mode, in which the flywheel clutch is engaged to rotate the crankshaft prior to initiating engine start.

6. The hybrid engine assembly of claim 1, in which the auxiliary device comprises a hydraulic pump.

7. The hybrid engine assembly of claim 1, in which the flywheel body includes a hub comprising a metal material and a rim comprising a carbon fiber material.

8. A machine not including a motor-generator set comprising:
   an engine including a crankshaft;
   a transmission operatively coupled to the crankshaft, the transmission including a transmission output shaft;
   at least one ground engaging member operably coupled to the transmission output shaft;
   a supplemental shaft mechanically coupled to the crankshaft;
   a flywheel energy storage assembly including a flywheel body coupled to a flywheel shaft, and a mechanical flywheel clutch configured to selectively and directly couple the flywheel shaft to the supplemental shaft;
   an auxiliary device selectively coupled to the flywheel shaft by an auxiliary clutch; and
   a controller operably coupled to the engine, the flywheel clutch, and the auxiliary clutch and configured to selectively operate in an auxiliary power mode in which the flywheel clutch is engaged and the auxiliary clutch is engaged.

9. The machine of claim 8, in which a gear set mechanically couples the supplemental shaft to the crankshaft.

10. The machine of claim 9, in which the gear set has a gear ratio of approximately 20:1.

11. The machine of claim 10, in which the gear set comprises a first spur gear coupled to the crankshaft and a second spur gear coupled to the supplemental shaft, wherein the first spur gear directly engages the second spur gear.

12. The machine of claim 8, in which the controller is configured to selectively operate the engine assembly in an engine restart mode, in which the flywheel clutch is engaged to rotate the crankshaft prior to initiating engine start.

13. The machine of claim 8, wherein the auxiliary device comprises a hydraulic pump.

14. A method of operating a hybrid engine assembly including an engine having a crankshaft, a flywheel energy storage assembly including a mechanical flywheel clutch configured for selective coupling to the crankshaft, and an auxiliary device, and an auxiliary clutch being configured to selectively couple the flywheel energy storage assembly to the auxiliary device, the hybrid engine assembly not including a motor generator set, the method comprising:
   selectively operating in an engine restart mode by directly coupling the flywheel energy storage assembly to the crankshaft prior to starting the engine, selectively operating in the engine restart mode including engaging the flywheel clutch, and disengaging the auxiliary clutch; and selectively operating in an auxiliary power mode by directly coupling the flywheel energy storage assembly to the auxiliary device, selectively operating in the auxiliary power mode including engaging the flywheel clutch, and engaging the auxiliary clutch.

15. The method of claim 14, in which the engine assembly includes a supplemental shaft operably coupled to the flywheel energy storage assembly, and a gear set mechanically coupling the supplemental shaft to the crankshaft.

16. The method of claim 15, in which the gear set has a gear ratio of approximately 20:1.

17. The method of claim 16, in which the gear set comprises a first spur gear coupled to the crankshaft and a second spur gear coupled to the supplemental shaft, wherein the first spur gear directly engages the second spur gear.

* * * * *